US008920234B2

(12) United States Patent
Hawver et al.

(10) Patent No.: US 8,920,234 B2
(45) Date of Patent: Dec. 30, 2014

(54) METHOD AND APPARATUS FOR PRESENTING INFORMATION ASSOCIATED WITH A GAME

(71) Applicant: STEELSERIES ApS, Valby (DK)

(72) Inventors: Bruce Hawver, Hawthorn Woods, IL (US); Jacob Wolff-Petersen, Richmond (GB); Kim Rom, Chicago, IL (US); Francis Arnold Grever, Palatine, IL (US); Jeffrey Nicholas Mahlmeister, Chicago, IL (US); Tino Soelberg, Copenhagen (DK); Christopher John Nicolella, Elf Grove Village, IL (US)

(73) Assignee: STEELSERIES ApS, Valby (DK)

( * ) Notice: Subject to any disclaimer, the term of this patent is extended or adjusted under 35 U.S.C. 154(b) by 41 days.

(21) Appl. No.: 13/706,500

(22) Filed: Dec. 6, 2012

(65) Prior Publication Data
US 2014/0162775 A1 Jun. 12, 2014

(51) Int. Cl.
A63F 13/00 (2014.01)
(52) U.S. Cl.
USPC ............................................................ 463/30
(58) Field of Classification Search
None
See application file for complete search history.

(56) References Cited

U.S. PATENT DOCUMENTS

| | | | |
|---|---|---|---|
| 6,105,098 A | 8/2000 | Ninose et al. | |
| 6,672,961 B1 * | 1/2004 | Uzun | 463/31 |
| 6,920,633 B1 | 7/2005 | Venkatraman et al. | |
| 7,653,684 B2 | 1/2010 | Bendapudi et al. | |
| 7,677,979 B2 | 3/2010 | Van Luchene | |
| 7,702,802 B2 | 4/2010 | Stillion et al. | |
| 7,743,128 B2 | 6/2010 | Mullarkey | |
| 7,940,686 B2 | 5/2011 | Lehew et al. | |
| 7,987,492 B2 | 7/2011 | Liwerant et al. | |
| 8,506,403 B2 * | 8/2013 | Muir | 463/40 |
| 2002/0142846 A1 * | 10/2002 | Paulsen | 463/43 |
| 2003/0078101 A1 * | 4/2003 | Schneider et al. | 463/42 |
| 2004/0002386 A1 * | 1/2004 | Wolfe et al. | 463/42 |
| 2004/0117831 A1 * | 6/2004 | Ellis et al. | 725/53 |
| 2004/0192440 A1 * | 9/2004 | Evans et al. | 463/30 |
| 2005/0149490 A1 * | 7/2005 | Shapiro | 707/1 |
| 2006/0121993 A1 * | 6/2006 | Scales et al. | 463/48 |
| 2006/0135261 A1 * | 6/2006 | Kinne et al. | 463/42 |
| 2006/0176827 A1 | 8/2006 | Lehew et al. | |
| 2009/0239657 A1 | 9/2009 | Ryan et al. | |
| 2009/0244289 A1 | 10/2009 | Raake | |
| 2009/0325709 A1 * | 12/2009 | Shi | 463/42 |
| 2010/0075751 A1 * | 3/2010 | Garvey et al. | 463/30 |
| 2010/0251027 A1 | 9/2010 | Yawalkar et al. | |

* cited by examiner

Primary Examiner — Masud Ahmed
(74) Attorney, Agent, or Firm — Guntin & Gust, PLC; Jay H. Anderson

(57) ABSTRACT

A method for indicating a pre-game environment quality level may include, for example, obtaining a profile associated with a video game, where the profile comprises desirable performance metrics for initiating the video game, performing performance metric measurements in collaboration with a computing device from which the video game is to be played, comparing the performance metric measurements to the desirable performance metrics, determining a discrepancy between the performance metric measurements and the desirable performance metrics, determining a gaming quality level according to the determined discrepancy, and presenting at the computing device a quality indicator based on the determined quality level. The presenting can further include graphically displaying the quality indicator and the discrepancy. Other embodiments are disclosed.

26 Claims, 11 Drawing Sheets

METHOD AND APPARATUS FOR PRESENTING INFORMATION ASSOCIATED WITH A GAME

FIELD OF THE DISCLOSURE

The present disclosure relates generally to a method and apparatus for presenting information associated with a game.

BACKGROUND

It is common today for gamers to play on-line games in a variety of locations, for example in cyber cafés. This is especially true of gamers who play on-line games with portable devices.

It is also common today for gamers to utilize more than one gaming accessory. This is especially true of gamers who play competitive games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories. A gamer can frequently use a combination of these accessories in one game (e.g., headset, a keyboard, and mouse).

BRIEF DESCRIPTION OF THE DRAWINGS

Reference will now be made to the accompanying drawings, which are not necessarily drawn to scale, and wherein.

DETAILED DESCRIPTION

Figure 1A:
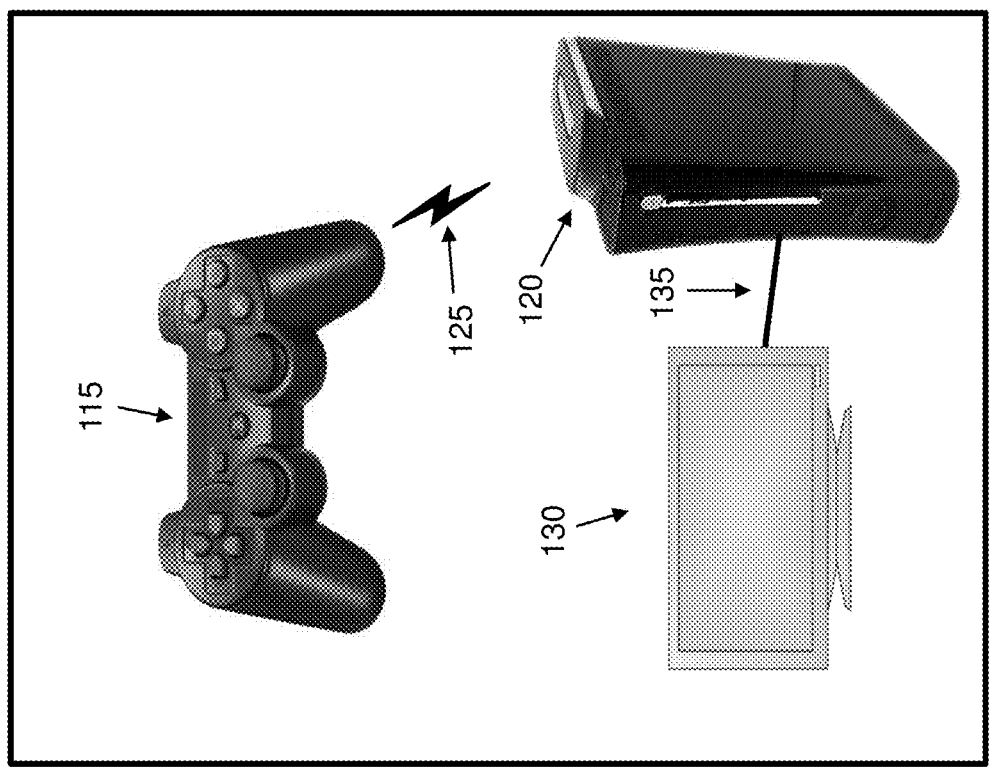
FIGS. 1A and 1B schematically illustrate game venues where a user can initiate a game, and from which information regarding the game environment quality for the game can be determined.

The subject disclosure describes, among other things, illustrative embodiments for determining and presenting a gaming environment quality level before a game is initiated and/or while the game is in execution. Other embodiments are contemplated by the subject disclosure.

One embodiment of the present disclosure can entail a method including obtaining a profile associated with a video game, where the profile comprises desirable performance metrics for initiating the video game, performing performance metric measurements in collaboration with a computing device from which the video game is to be played, comparing the performance metric measurements to the desirable performance metrics, determining a discrepancy between the performance metric measurements and the desirable performance metrics, determining a gaming quality level according to the determined discrepancy, and presenting at the computing device a quality indicator based on the determined quality level. The presenting can further include graphically displaying the quality indicator and the discrepancy.

The performance metric measurements in the method can further include measurement of a processor resource availability, measurement of a speed of a network with which the computing device communicates, or a round trip communication network test. The method can also include performing a functional test at the computing device.

The method can also include obtaining performance metric measurements relating to one or more other computing devices being used to play the video game at a remote location, determining a second gaming quality level for initiating the video game at the remote location according to the obtained performance metric measurements, and presenting at the computing device a second quality indicator for the remote location based on the second gaming quality level. The method can further include presenting a recommendation to use the remote location for initiating the video game based on one of the second gaming quality level, a distance between a present location of the computing device and the remote location, or both.

One embodiment of the present disclosure can entail a gaming device including a memory to store instructions and a processor coupled to the memory. When executing the instructions, the processor performs operations including obtaining a profile associated with a game to be played with the gaming device, where the profile includes desirable performance metrics for playing the game, performing performance metric measurements for a computing environment of the gaming device and for a network coupled to the gaming device, comparing the performance metric measurements to the desirable performance metrics, determining a difference between the performance metric measurements and the desirable performance metrics, and determining a gaming quality level according to the determined difference.

The operations performed by the processor can also include presenting an indicator of the gaming quality level via a graphical user interface, and performing a functional test in a computing or networking environment where the gaming device is located. The operations can further include determining a second gaming quality level for playing the game at a location remote from a present location of the gaming device, and presenting an indicator descriptive of the second gaming quality level.

One embodiment of the present disclosure can entail a computer-readable storage medium having computer instructions, which when executed by a processor, cause the processor to perform operations including performing a computing environment quality metric measurement for playing a game, determining a quality level for playing the game based on a comparison of the computing environment quality metric measurement and predetermined environment quality factors associated with the game, and presenting an indication of the determined quality level. The indication can be descriptive of a measure of achieving predetermined environment quality factors. The operations can also include performing a network environment quality metric measurement for a network, the network environment quality metric measurement includes one of a first measure of a speed of communication using the network, a second measure of noise in the network, or both.

The operations can further include determining a second gaming quality level for a remote location, and presenting a second indication descriptive of the second gaming quality level of the remote location.

FIG. 1A schematically depicts a gaming venue 100 in which a gamer may engage in a game using gaming controller 115, according to an embodiment of the disclosure. In this embodiment, gaming controller 115 and gaming console 120 have an integrated wireless interface for wireless communications therebetween. The gaming console 120 is coupled to network 150 via communication link 145 such a Wireless Fidelity (WiFi) link to the internet. The gaming console 120 can be, for example, an Xbox™, a PS3™, a Wii™, or another suitable gaming console device. Video information is displayed to the gamer on display device 130, which in this illustration is coupled to gaming console 120 by a wired connection 135. Display device 130 may be a television or a touch screen so that it comprises both an input device and an output device for the online game.

As shown for example in FIG. 1A, the gaming environment generally may include the computing environment with which the gamer interacts at the venue, the network environment, including communication between the gaming console 120 and the network 150, and the physical environment of the venue (lighting level, noise level, etc.). All of these can contribute to the level of game environment quality, which in turn affects the gamer's experience.

It is understood that the devices shown in FIG. 1A are merely examples of a wide variety of computing devices that may be used in an online game. For instance, in FIG. 1B a desktop computer 162 can be used in place of the gaming console 120. The desktop computer 162 can be configured to execute a gaming client (i.e., a software application) acting in cooperation with an on-line gaming server 172 accessible by the desktop computer 162 via the network 150 (e.g., World of Warcraft™). The gaming peripheral used with the desktop computer 162 can be a keyboard 164, mouse 166, or another suitable gaming peripheral device (e.g., a headset for conveying speech signals and/or listening to other gamers in an online game setting).

Figure 1B:
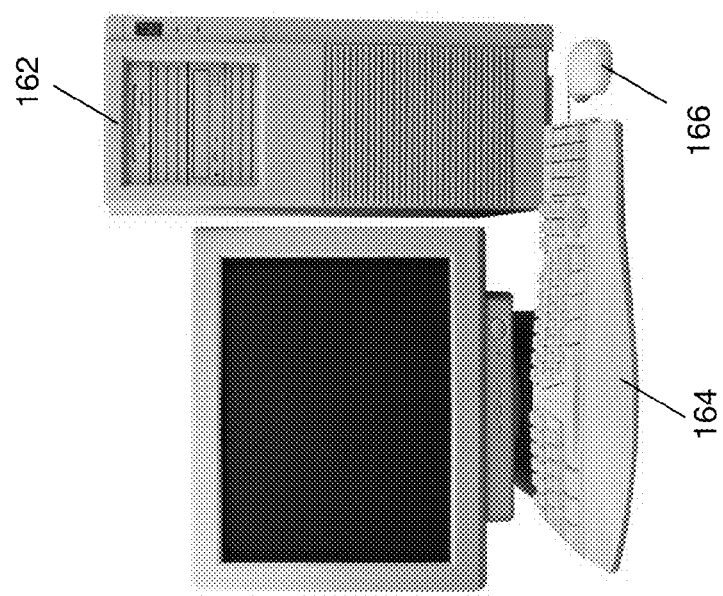
Figure 1B:
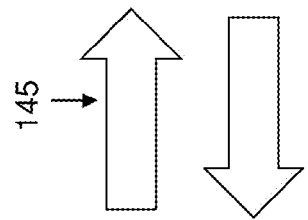
Figure 1B:
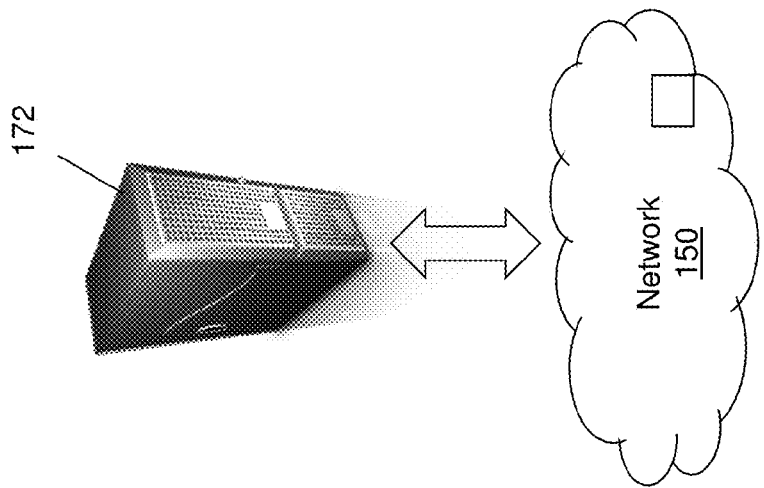
Figure 2:
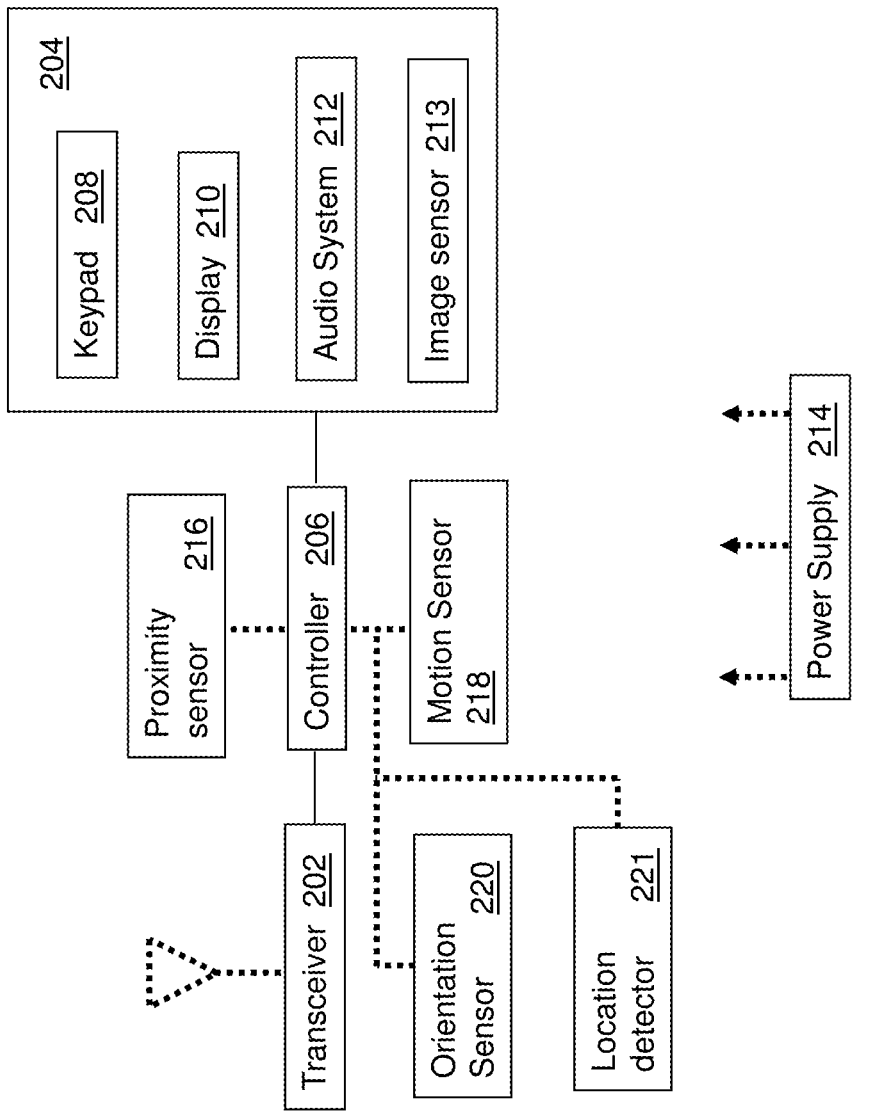
FIG. 2 depicts an illustrative embodiment of a communication device, which can embody portions of the devices shown in FIGS. 1A and 1B.

FIG. 2 depicts an illustrative embodiment of a computing device 200. In one embodiment, the computing device 200 can embody in whole or in part any of the devices shown in FIGS. 1A and 1B. The computing device 200 can comprise a wireline and/or wireless transceiver 202 (herein transceiver 202), a user interface (UI) 204, a power supply 214, a proximity sensor 216, a motion sensor 218, an orientation sensor 220, a location detector 221, and a controller 206 for managing operations thereof. The transceiver 202 can support short-range or long-range wireless access technologies such as Bluetooth, WiFi, Digital Enhanced Cordless Telecommunications (DECT), or cellular computing technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless computing technologies as they arise. The transceiver 202 can also be adapted to support circuit-switched wireline access technologies (such as PSTN), packet-switched wireline access technologies (such as TCP/IP, VoIP, etc.), and combinations thereof.

Visual and audible aspects of the UI 204 can be generated by an Accessory Management Software (AMS) application, which can be executed on a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, or a media player (such as an iPOD™). In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a gaming controller, a mouse, a joystick, a microphone, a headset with a microphone, or any of a variety of other devices. It is contemplated that the AMS application can be executed by any device with suitable computing resources.

The UI 204 can include a depressible or touch-sensitive keypad 208 coupled to a navigation mechanism such as a roller ball, a joystick, a mouse, or a navigation disk for manipulating operations of the computing device 200. The keypad 208 can be an integral part of a housing assembly of the computing device 200 or an independent device operably coupled thereto by a tethered wireline interface (such as a USB cable) or a wireless interface supporting for example Bluetooth. The keypad 208 can represent a numeric keypad, and/or a QWERTY keypad with alphanumeric keys. The UI 204 can further include a display 210 such as monochrome or color LCD (Liquid Crystal Display), OLED (Organic Light Emitting Diode) or other suitable display technology for conveying images to the user of computing device 200.

In an embodiment where the display is touch-sensitive, a portion or all of the keypad 208 can be presented by way of the display with navigation features (e.g., an iPad™, iPhone™, or Android™ phone or tablet). As a touch screen display, the computing device 200 can be adapted to present a user interface with graphical user interface (GUI) elements that can be selected by a user with a touch of a finger. The touch screen display 210 can be equipped with capacitive, resistive or other forms of sensing technology to detect how much surface area of a user's finger has been placed on a portion of the touch screen display. This sensing information can be used to control the manipulation of the GUI elements.

The UI 204 can also include an audio system 212 that utilizes common audio technology for conveying low volume audio (such as audio heard only in the proximity of a human ear) and high volume audio (such as speakerphone for hands free operation, stereo or surround sound system). The audio system 212 can further include a microphone for receiving audible signals of an end user. The audio system 212 can also be used for voice recognition applications. The UI 204 can further include an image sensor 213 such as a charged coupled device (CCD) camera for capturing still or moving images and performing image recognition therefrom. The audio system and image sensor may also be configured to measure the ambient noise and light levels of the gaming venue.

The power supply 214 can utilize common power management technologies such as replaceable or rechargeable batteries, supply regulation technologies, and charging system technologies for supplying energy to the components of the computing device 200 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 216 can utilize proximity sensing technology such as a electromagnetic sensor, a capacitive sensor, an inductive sensor, an image sensor or combinations thereof. The motion sensor 218 can utilize motion sensing technology such as an accelerometer, a gyroscope, or other suitable motion sensing technology to detect movement of the computing device 200 in three-dimensional space. The orientation sensor 220 can utilize orientation sensing technology such as a magnetometer to detect the orientation of the computing device 200 (North, South, West, East, combined orientations thereof in degrees, minutes, or other suitable orientation metrics). The location detector 221 can comprise a global positioning system (GPS) receiver for sensing signals from a constellation of satellites and for determining from such signals a location of the computing device 200.

The computing device 200 can use the transceiver 202 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 206 can utilize computing technologies such as a microprocessor, a digital signal processor (DSP), and/or a video processor with associated storage memory such as Flash, ROM, RAM, SRAM, DRAM or other storage technologies.

The computing device 200 as described herein can operate with more or fewer components than described in FIG. 2 to accommodate the implementation of the devices described by the present disclosure. These variant embodiments are contemplated by the present disclosure.

Figure 3:
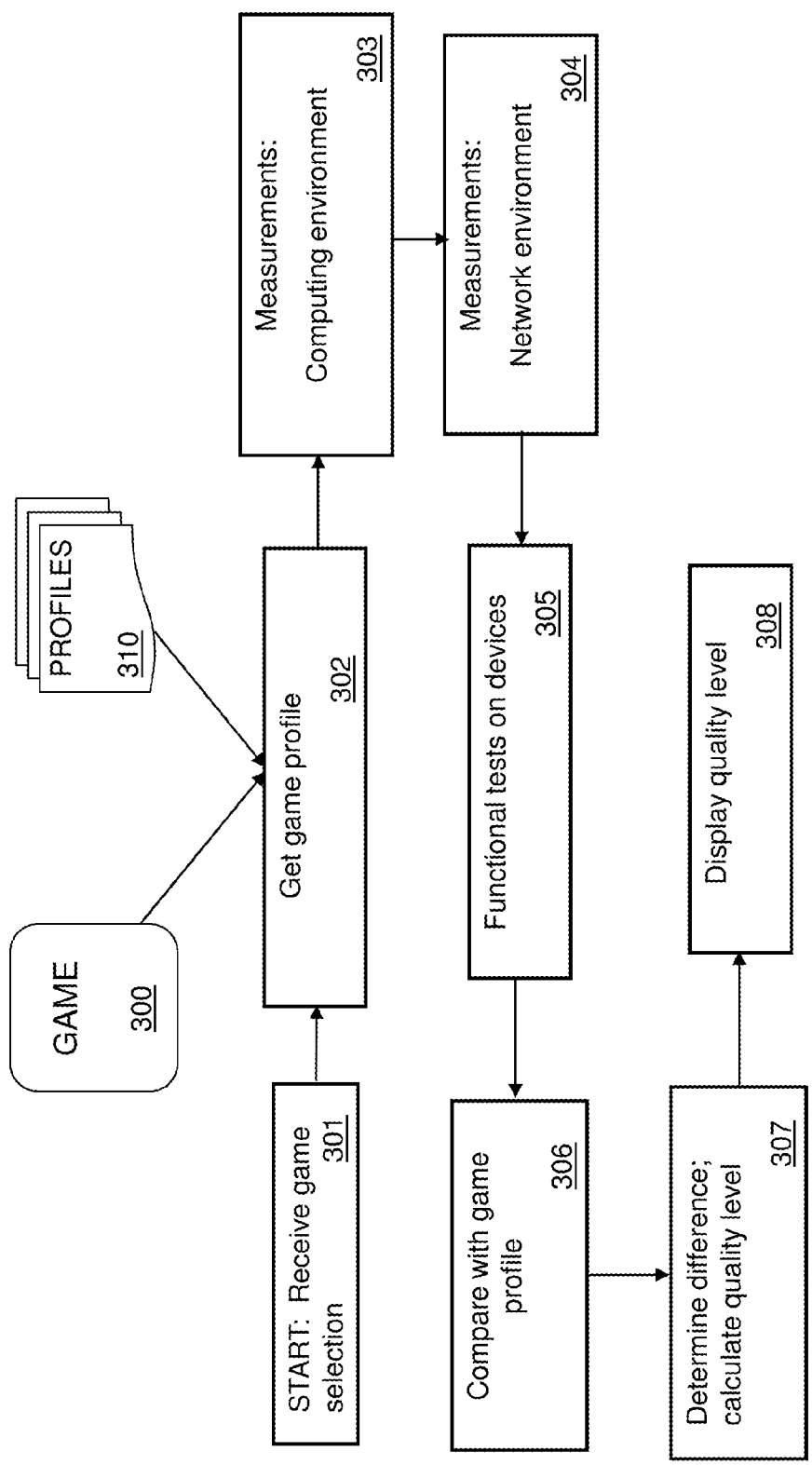
FIGS. 3 and 4 depict methods for determining and presenting a game environment quality level, in accordance with an embodiment of the disclosure.
Figure 4:
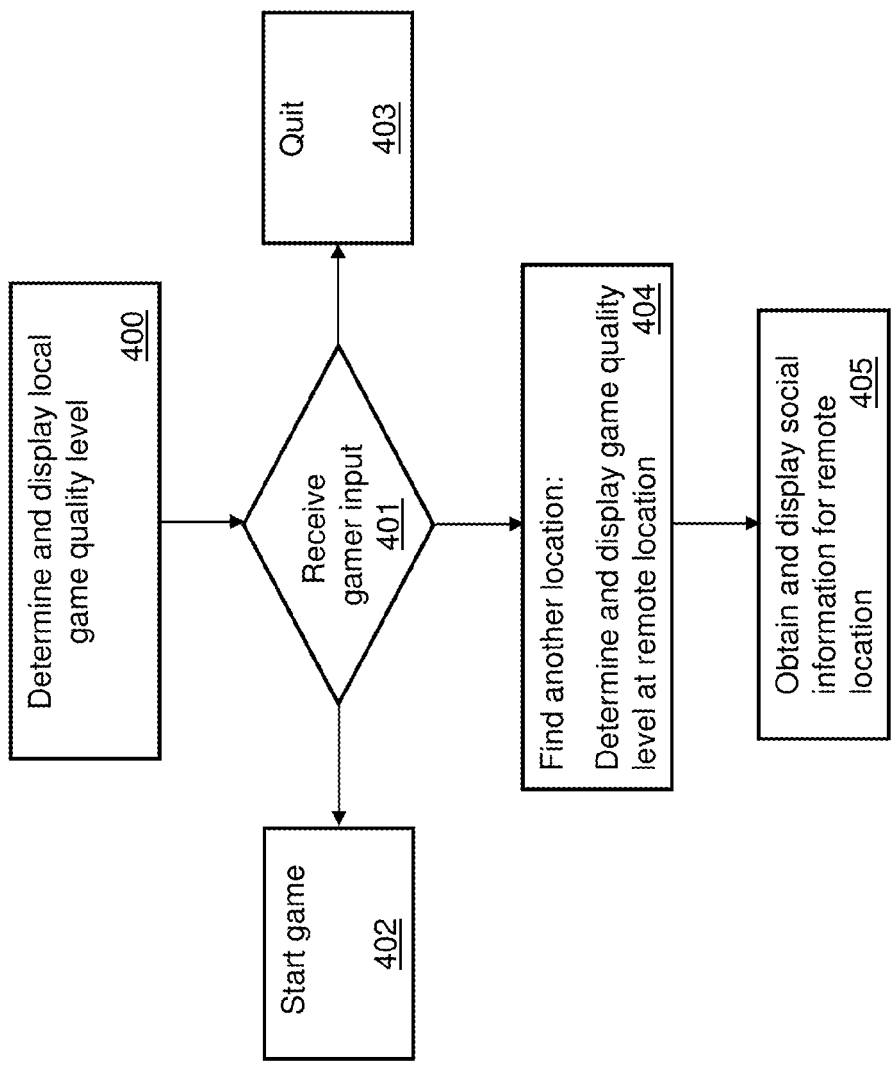

FIGS. 3 and 4 illustrate procedures for determining and presenting a game environment quality level, in accordance with embodiments of the disclosure. In these embodiments, it is assumed that the procedures are performed by the AMS executing on a gaming device with computing resources (e.g., CPU and memory) such as the gaming console 120 of FIG. 1A, the computer 162 or on-line gaming server 172 of FIG. 1B, or the gaming accessories themselves (when such devices also include computing resources) such as the gaming controller 115 of FIG. 1A, the keyboard 164 or mouse 166 of FIG. 1B, or any other device with computing resources. From these embodiments, it would be evident that the gaming device may be any of a wide variety of devices. Furthermore, the AMS may be stored on, and/or downloaded from, a wide variety of locations (either local or remote with respect to the gaming accessory). Additionally, portions of the AMS may be executed in multiple devices. For example, the AMS can be configured in a client-server arrangement with the client portion executed from one device (e.g., the desktop computer 162) and the server portion executed from the on-line gaming server 172. In another embodiment, the client portion of the AMS can also operate from a portable peripheral with computing resources such as the mouse 166.

The AMS, via the gaming device, receives a stimulus from the gamer indicating that a particular game is to be initiated (step 301). In general, there are various required hardware and software performance metrics associated with the game (minimum memory capacity, processor speed, OS version, etc.). In accordance with embodiments of the disclosure, the selected game 300 has associated therewith a profile of hardware and software performance metrics prescribed for a desirable gaming experience (hardware configuration, software settings, etc.). In an embodiment, this profile may be obtained from the game itself.

Alternatively, the profile may be obtained from a library of profiles 310 containing profiles for different games (or different versions of a game). A profile may be contributed to the library by the publishers of the game, or may represent past experience by one or more gamers. In an embodiment, the game profile is constructed by the gamer to reflect the gamer's preferences. For example, a competitive gamer can specify a minimum Internet connection bandwidth that is greater than the minimum bandwidth recommended by the game publisher. The gamer can also set preferences for locations of interest to engage in a gaming session. Other preferences such as preferred social network members, video game preferences, and other suitable user preferences can be taken into consideration with the embodiments of the subject disclosure.

The game profile is retrieved by the AMS in step 302. Measurements of performance metrics can be performed for various factors that contribute to the game environment quality as identified in the game profile. In one embodiment, the gaming profile can provide the basis for the performance metrics that ought to be measured by the AMS. In step 303, measurements can be made by the AMS regarding the computing environment: CPU availability (possibly measured by percentage of cores in use for a multi-core CPU), memory usage, etc. In step 304, measurements can be made by the AMS regarding the network environment: network speed, network reliability, etc. In an embodiment, the AMS can send one or more packets on a round-trip test (sometimes called a pinging test), the AMS may perform multiple pinging tests to measure the reliability of the network. The AMS may also measure packet loss, bit rate errors, jitter, latency, or other measurable communication metrics of the network. In step 305, functional tests can be performed on the various devices. This may include checking each battery-powered device for battery status (e.g., checking for a low-battery condition). Measurements may also be performed regarding the physical environment of the game (lighting level, noise level, etc.), which may be measured by sensors of the gaming device.

In step 306, the performance metric measurements can be compared with the game profile. A difference between desirable performance metrics specified by the profile and the measured performance metrics can be used to calculate the environment quality level for the game (step 307). Different factors may be given different weight in the calculation, in accordance with its likely affect on the gamer's experience, for example, CPU availability may be given more weight than the ambient noise level. In an embodiment, the weights of the various factors can be specified by the gamer for a particular game. The quality level can be presented to the gamer as a displayed measure of the disparity determined in step 307 (step 308).

Figure 5:
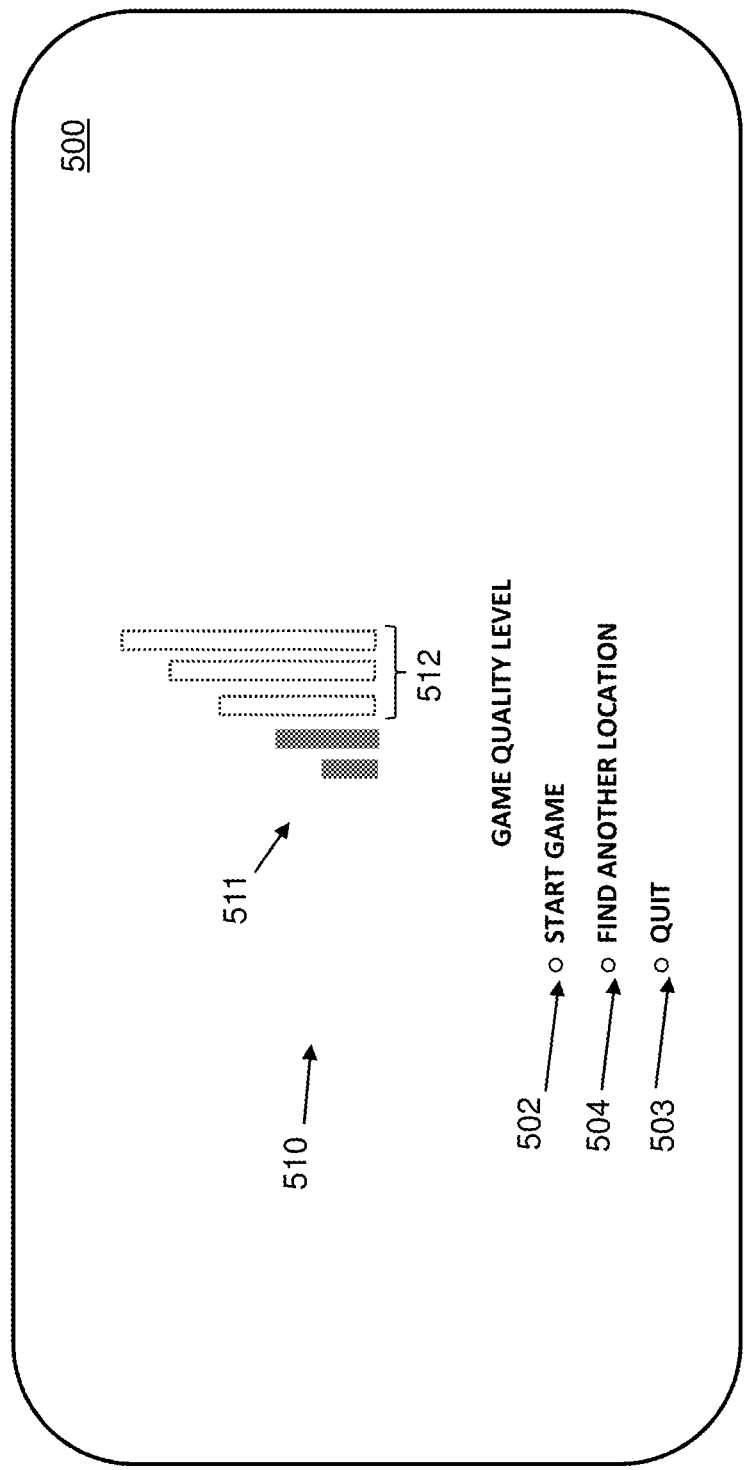
FIG. 5 depicts an illustrative embodiment of a presentation to a gamer of a game environment quality level according to the method of FIG. 3.

A local quality level can be displayed to the gamer by a suitable presentation device. The term "local" is representative of the quality level experienced at a location of the gamer. The local quality level can be presented by way of a display device of the gaming device. For example, the quality level can be displayed at a television or monitor 130 as shown in FIG. 1A, or the computer monitor of the desktop computer 162 as shown in FIG. 1B. In another embodiment, a gaming peripheral can include a display or LEDs indicating the quality level. For example, the mouse of FIG. 6 can be equipped with LEDs that project light through quality level bars as shown in FIG. 5 (see references 511-512). A closer correspondence with the game profile indicates a higher game environment quality level. In one embodiment, the quality level can be expressed relative to the quality level corresponding to the game profile by a graphic 510 in display 500. As more bars of progressively greater height are highlighted, the better the game quality level is for playing the game. In the example of FIG. 5, two bars 511 are displayed while three bars 512 are not displayed (or alternatively displayed only in outline).

In an embodiment, the game environment quality at the gamer's location can be compared with a game environment quality at a different location (FIG. 4). After viewing the display of the local game quality level (step 400), the gamer decides whether to start the game (step 402), quit (step 403), or find another location for playing the game. In an embodiment, the gamer inputs this decision at step 401 via radio buttons 502, 503, 504 displayed with the local game quality level. In step 404, the AMS retrieves information over the network regarding the game quality level experienced by gamers playing the selected game at other locations. The information retrieved for other gamers can represent instances of the embodiments of the method of FIG. 3 being performed for these gamers, which can be stored in a remote database, which may be accessible to the AMS for assessing alternative environments for playing the game selected by the gamer. In a further embodiment, the AMS may retrieve information from a social network regarding gamers playing the selected game to determine gamers who may be associated with social groups, as a measurement of a social environment at the other locations (step 405) that may be of interest to the gamer.

The game quality levels for other locations can also be displayed to the gamer. FIG. 6 shows a game quality level display 600 in accordance with an embodiment of the disclosure. In this embodiment, display 600 includes graphic displays 610, 620 showing game quality levels for two other venues. The quality levels shown may be an average of several gamers at each location. As in FIG. 5, a closer correspondence with the game profile indicates a higher game environment quality level in graphic displays 610 and 620. In particular, more bars can indicate a better game quality level. In display 610, two bars 611 are displayed while three bars 612 are not displayed (or alternatively displayed only in outline). In display 620, three bars 621 are displayed while two bars 622 are not displayed (or alternatively displayed only in outline).

Each display 611, 612 includes the name and distance to the other location relative to the location of the gamer seeing displays 611-612. The location of the gamer can be determined by the AMS by way of the location detector 221 (describes earlier) which may be embedded in the gaming device, user input provided by the gamer identifying the gamer's location, or other suitable location determination methods. In an embodiment, information regarding gamers at a particular location may also be provided, as in display 625 (e.g., gamer 1: Biguser0001, gamer 2: spacemanspiff, etc.). For example, if the other gamers are situated in a location that can be determined by the AMS (by way of information provided by the other gamers to a server accessible to the AMS, or the location is public and can be determined by public means), the name of the location can also be displayed by the AMS at the gaming device (e.g., Have-A-Byte-Café, Cybertown Café, etc.).

The foregoing embodiments are a subset of possible embodiments contemplated by the present disclosure. For example, the AMS can also track model numbers of the gaming peripherals, operating system versions, CPU versions, and so on. The profile retrieved at step 302 of FIG. 3 can provide suggestions for alternative hardware and/or software models to improve the gaming experience for a gamer. The suggestions can be linked to websites from which hardware or software accessories may be purchased by the gamer. The methods of FIGS. 3 and 4 can be further adapted to improve the gamer's environment once a quality level determination has been made. For example, the AMS can analyze background processes being used by the CPU of the gaming device and suggest termination of certain processes to improve the gaming experience.

In an embodiment where the AMS operates from an on-line gaming server, the AMS can determine that the gamer is at a location where the gaming experience would be improved if the game were played from a gaming server in proximity to the determined location of the gamer. In this instance, a first on-line gaming server can delegate execution of the game to a second on-line gaming server in closer proximity to the gamer.

The methods of FIGS. 3 and 4 can also be adapted to provide sharing of gaming quality measures between gamers. For example, the AMS of gamer 1 can transmit via the gaming device to the AMS of gamer 2 the gaming quality level of gamer 1, and vice-versa. This information can be used by each gamer to determine whether the gaming environment is equitable or disadvantages to one of the gamers. This information can also be used by the AMS of the advantage player to reduce the advantage to equalize the game. For example, the AMS of the advantaged gamer can intentionally change CPU resources, memory resources, or other performance metrics to equalize the game. This can be done by the AMS artificially invoking CPU processes, changing memory allocation to processes, or other suitable approaches to reduce the advantage of a particular gamer.

In another embodiment, the quality level can be numeric rather than symbolic. For example, the AMS can percentages, ranking of 1 to 5, etc. The AMS can also present the quality level audibly rather than visually. In yet another embodiment, a server can track the quality levels of gamers at various locations. The server can be configured to identify locations where gaming quality consistently is low, and inform gamers to avoid such locations, or inform service providers to mitigate the issues detected in such locations. In the latter case, the server can provide service providers measurements it has performed relative to networks in the affected area, the ID of network elements (e.g., SSID of a WiFi router if known), and so on.

In another embodiment, the AMS can perform tests on gaming peripheral(s) (e.g., mouse) used to play the game and detect in some instances wear and tear. For example, in the case of a laser mouse, the AMS may detect that the optical equipment is providing jittery navigation data when moving the mouse on a mouse pad. When wear and tear is detected, the AMS can present the user a notice that the peripheral may be malfunctioning and recommend a replacement peripheral determined from a search performed by the AMS. The AMS can also suggest ways to perform maintenance on the device (e.g., wipe the optics of the mouse).

Figure 6A:
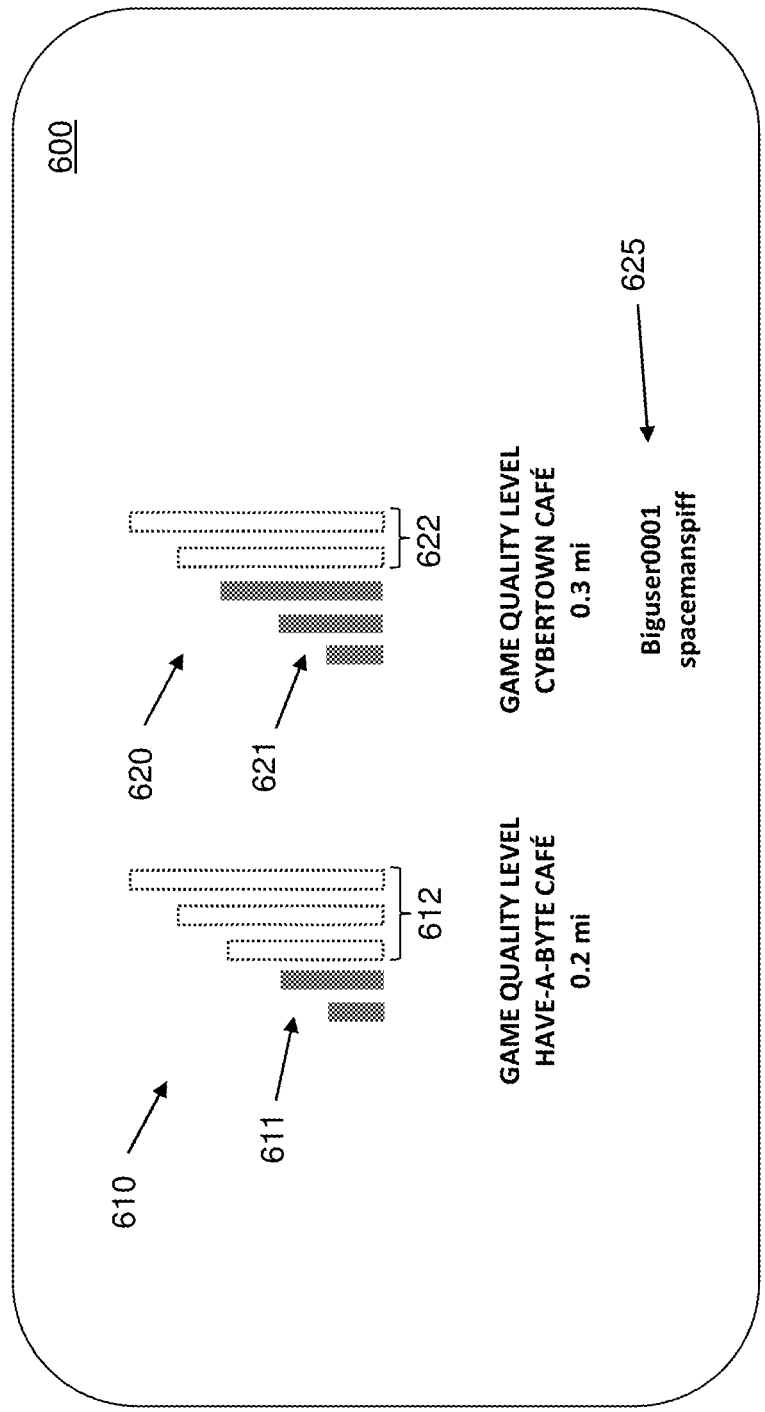
FIG. 6A depicts an illustrative embodiment of a presentation to a gamer of game environment quality levels according to the method of FIG. 4.
Figure 6B:
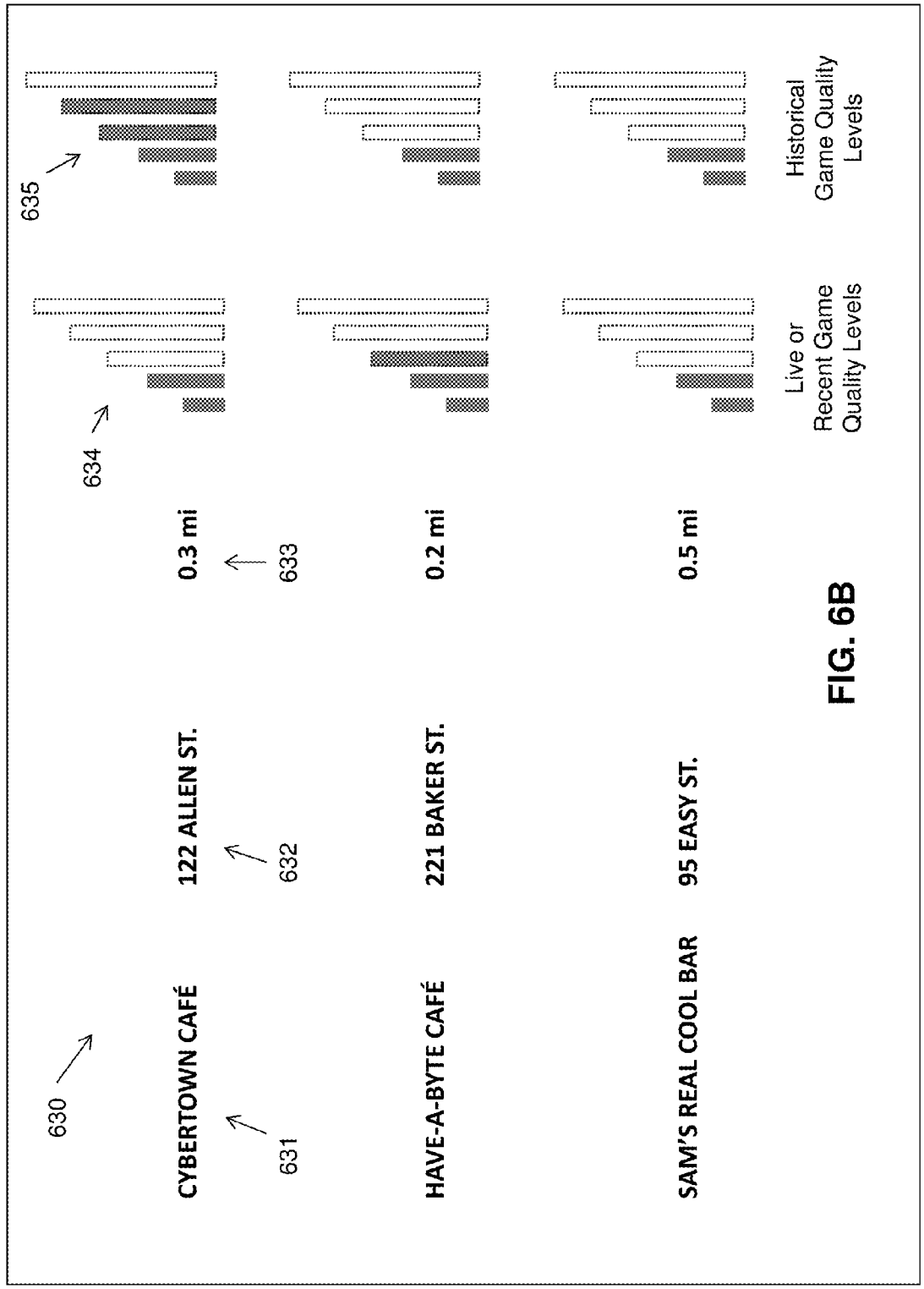
FIG. 6B depicts an illustrative embodiment of a presentation to a gamer of game environment quality levels for different gaming locations, based on game environment quality data and historic game environment quality data.

In an additional embodiment, the AMS may gather data related to game quality levels for different locations, based on either real-time (or recently measured) data or historical data. The quality level may be displayed in a graphic including bars as described above. FIG. 6B illustrates a display of game quality levels for a plurality of remote game venues in accordance with this embodiment, listing all game venues within a given distance of the gamer's present location (for example, 1.5 miles). As shown in FIG. 6B, a list 630 of game venues has the name of each venue 631, its physical location 632, its distance 633 from the gamer's present location, and a graphic illustration of game quality level.

In this embodiment, two graphics 634, 635 showing game quality level can be displayed for each venue. Graphic 634 shows the current ("live") or recent (e.g., 24 hours) game quality level for the venue according to real-time or recent hardware and software performance metrics as detailed above. If several gamers are currently at the venue, the live game quality level may be determined (in whole or in part) from an average game quality experienced by those gamers. Alternatively, the remote game venue may permit a pinging test by the AMS server to a communication access point (e.g., a gateway, router, model, or combinations thereof) of the remote game venue. The live or recent game quality level for a remote venue may thus be determined from data relating to gamers at that venue, from data retrieved by the AMS server, or a combination thereof.

Graphic 635 shows the "historical" game quality level, based on data collected for the hardware and software performance metrics over a given period of time (for example, the previous 10 days). The graphics may be presented as bars of progressive height as shown in FIG. 6B, or presented in some other format (for example, a number on a scale of 1 to 10). Graphics for live game quality level and historical game quality level may be displayed alongside each other, as shown in FIG. 6B. Alternatively, the graphics may be displayed singly, with the user able to toggle between them (for example, by clicking on the graphic, clicking on a radio button, etc.).

In one embodiment, a user can retrieve the presentation illustrated in FIG. 6B by selecting quality bars on a system tray of an operating system much the same way users visualize WiFi hotspots in the vicinity of the user when making such a selection. The WiFi quality bars and the gaming quality bars can be distinguished by adding an additional symbol to the game quality bars (e.g., the letter "GQ" for gaming quality), or by changing the color of the game quality bars to make such a distinction.

In an additional embodiment, the AMS can display details regarding the game, including the source of data for a game quality level, for a game being played at the gamer's location or at a remote location. For example, display 500 of a local game quality level (FIG. 5) can include a display alongside graphic 510. This display can include text with the name of the game whose profile is used to compute the quality level, the source of the data (for example, network tests or reports from other gamers), and the measurements performed (for example, pinging tests and/or functional tests). Alternatively, the display can include iconic symbols to indicate the name of the game, the data sources, or the measurements performed. In an embodiment, the display is presented automatically if a particular game is currently being played, to provide information about that game.

In another embodiment, the game quality levels can be grouped by game type. For example, game quality levels for one game (e.g., World of WarCraft—WoW) can be grouped together. In one embodiment, game quality levels for WoW can be presented together in one GUI such as shown in FIG. 6B, while game quality levels for another game can shown in another GUI. In one embodiment, the AMS can be adapted to present a drop-down menu for selecting a specific video game, which in turn generates a GUI with game quality levels for the particular game selected. In another embodiment, symbols (iconic or otherwise) can be presented in a system tray, which are selectable for presenting game quality levels. Each symbol can be unique and descriptive of a particular game. For example, a symbol can be the trade symbol for the game so that it is readily identifiable to the user. A user can select the system tray and then the symbol of a particular game, which in turn generates a GUI presentation of game quality levels for the game of the selected symbol.

Figure 6C:
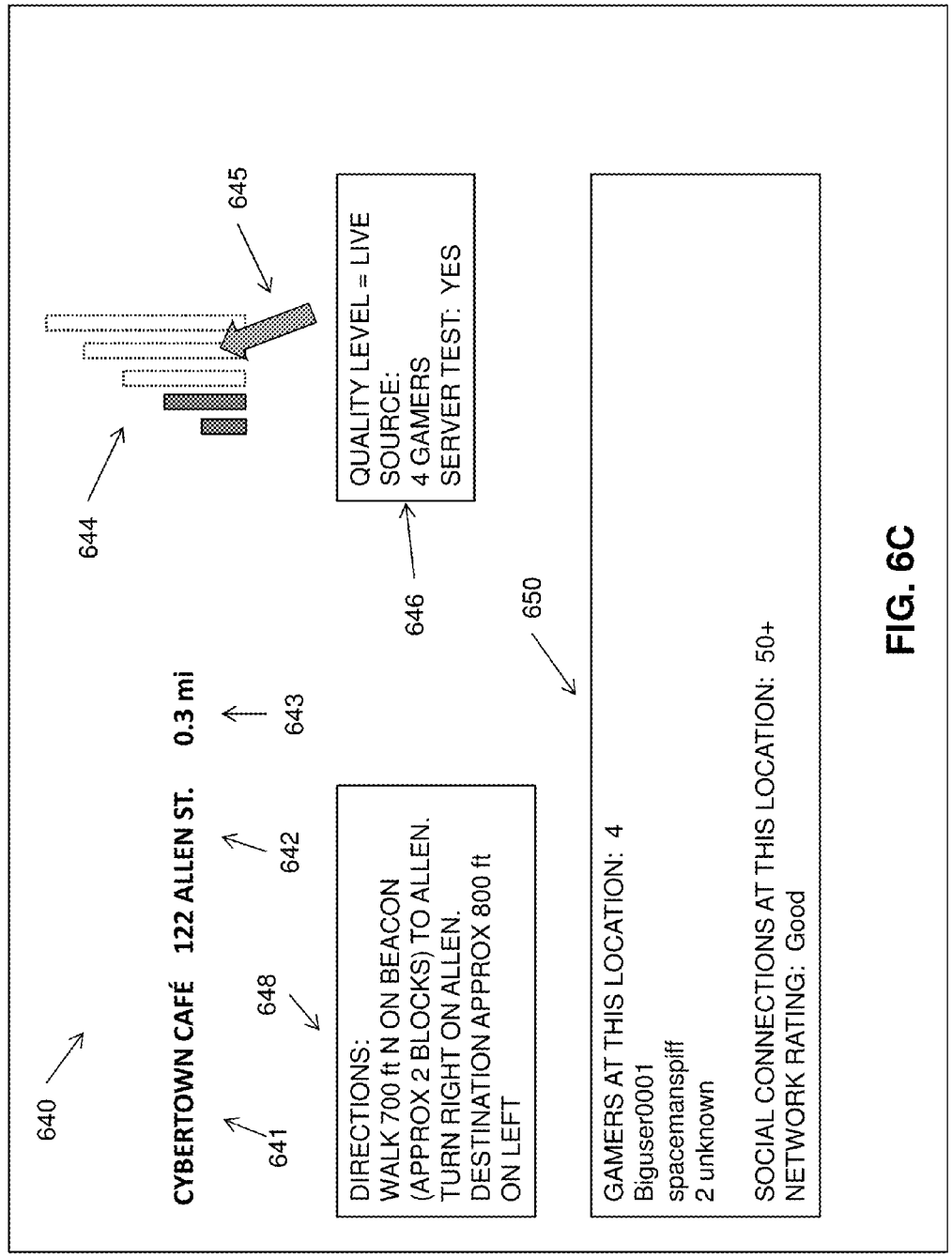
FIG. 6C depicts an illustrative embodiment of a presentation to a gamer of additional information pertaining to game environment quality and social networking for a selected gaming location.

FIG. 6C shows a display 640 of information for a selected remote game venue (selected, for example, by clicking on the entry for that venue in the list 630 or by running a mouse pointer over items of list 630). Display 640 can include the name of each venue 641, its physical location 642, and its distance 643 from the gamer's present location. A graphic 644 shows the game quality level for the remote venue. In this embodiment, moving a cursor 645 over graphic 644 causes a display 646 to appear, indicating for example whether the displayed game quality level is based on live (or recent) data or historical data, and the source of the data (for example, averaged data of a given number of gamers at that location, results of a pinging test, etc.).

The information display 640 for a selected remote venue can also include directions 648 from the gamer's present location to the selected remote venue. In addition, a display 650 can be provided relating to social networking among the gamers. For example, gamers already at the remote venue may be identified by pseudonyms known to their social group. If the gamer viewing display 650 is already acquainted with gamers at the selected remote venue, the number of social connections (for example, number of mutual friends) with those gamers can be displayed, and a "network rating" for relationships among the gamers may be displayed, based (for example) on data relating to the gamers retrieved from a social networking website.

Figure 6D:
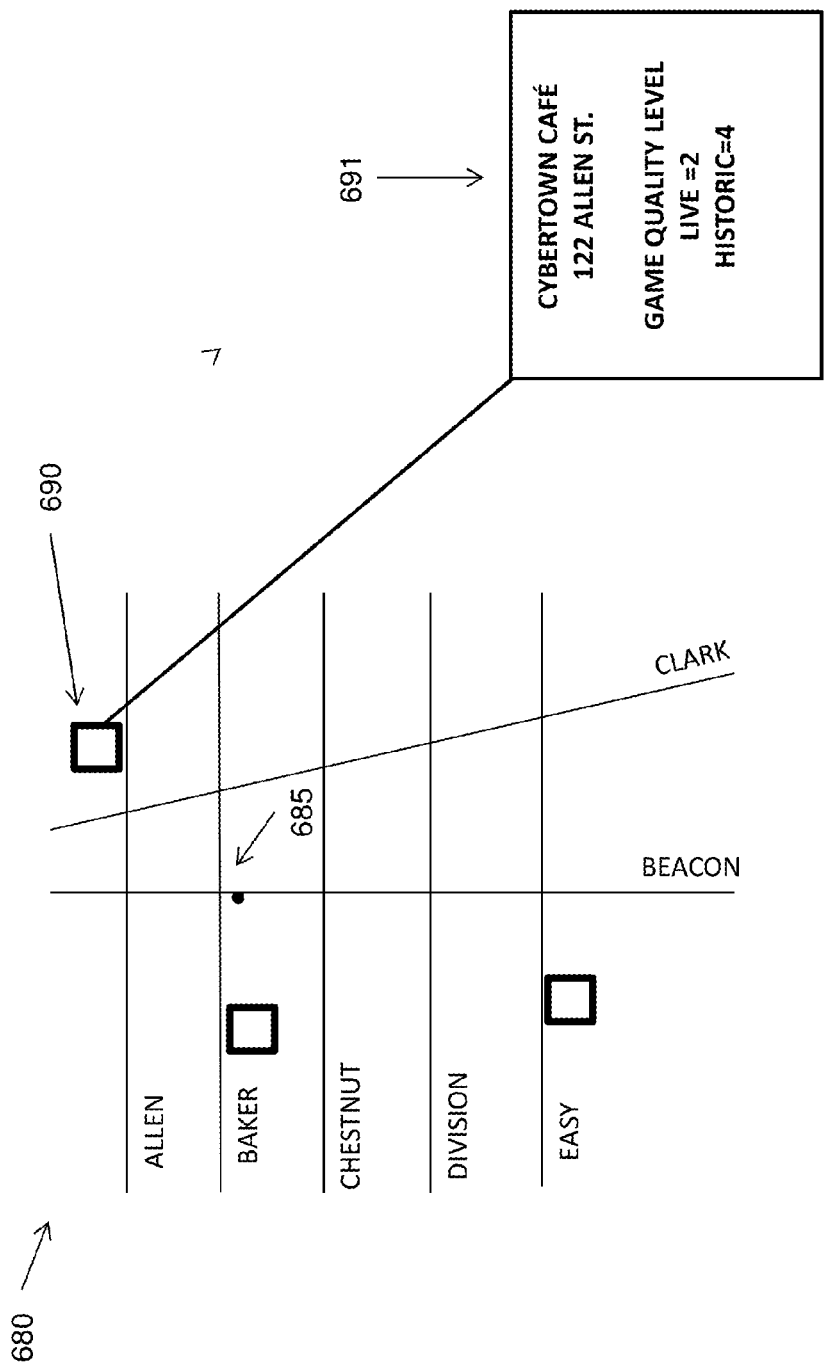
FIG. 6D depicts an illustrative embodiment of a presentation to a gamer of a map of gaming locations.

According to an additional embodiment, information regarding various gaming venues may be displayed as a map overlay 680, as shown for example in FIG. 6D. This format is desirable when several venues are in close proximity in an urban neighborhood, so that the gamer may easily judge which location is the most convenient to his present location 685. As shown in FIG. 6D, each venue may be identified by an icon 690 on the map. In a further embodiment, moving a cursor over an icon can cause a display 691 to appear, providing more detailed information regarding that gaming venue.

It should be noted that the illustrations of FIG. 5 through FIGS. 6A-6D can be presented by multiple devices of a gamer (e.g., desktop computer, laptop computer, tablet, smartphone, etc.). A gamer can install client software in any device which can communicate via the internet or other suitable communication network to perform the embodiments described above. It is further noted that the AMS application can track the location of a gamer based on location information provided by the gamer through user input provided at an interface of a communication device of the gamer, or by way of coordinate data (e.g., GPS coordinates) provided by the communication device of the gamer. It is also noted that the AMS application can have access to a database of locations where gamer(s) can engage in gaming activities, and can periodically monitor the quality of gaming in these locations, and share results with one or more gainers according to the embodiments described above. The AMS application can also track gaming quality at locations specified by each gamer, thereby providing each gamer results tailored to the gamer's preferred gaming locations.

Other suitable modifications can be applied to the present disclosure.

Figure 7:
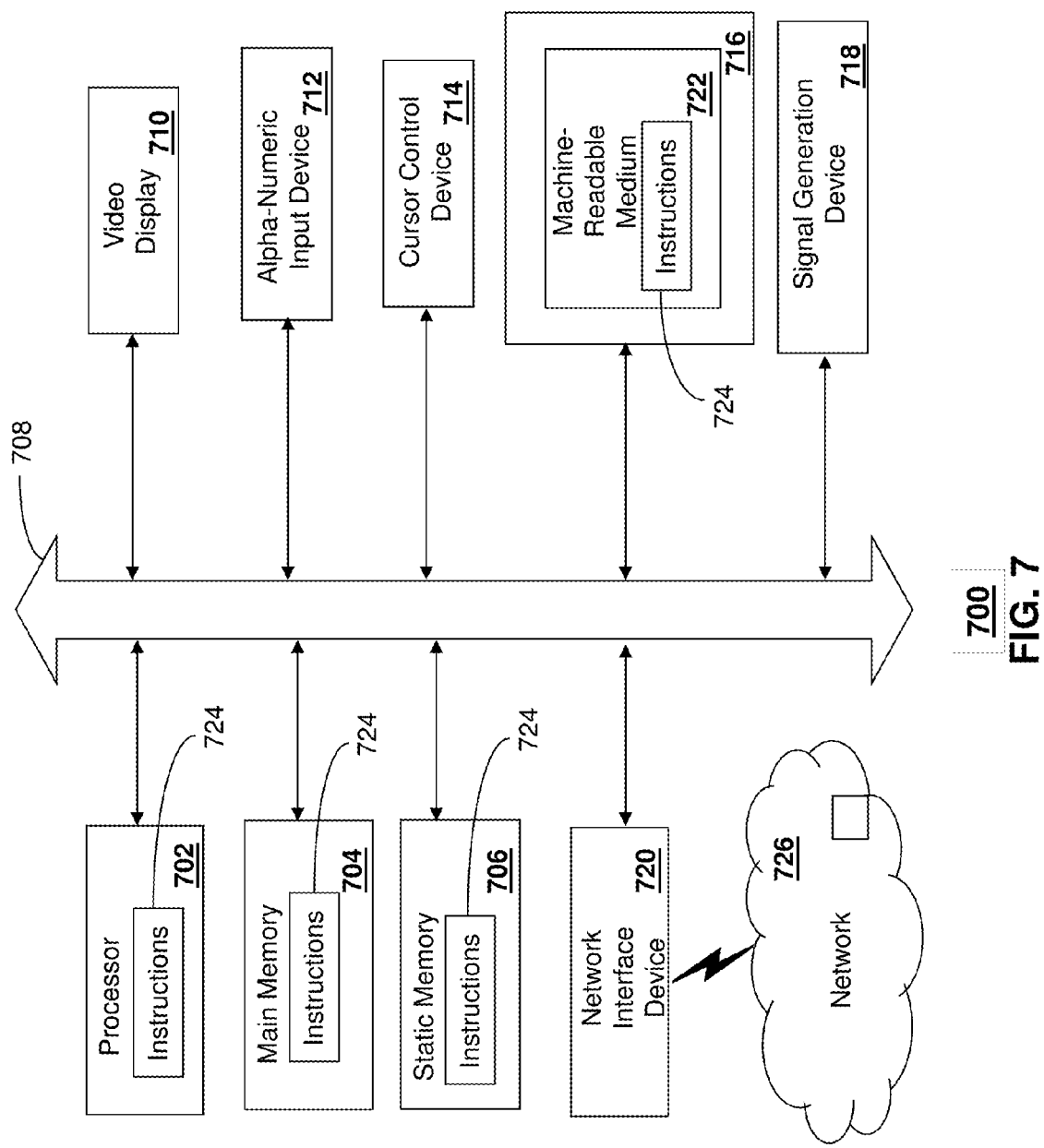
FIG. 7 depicts an illustrative diagrammatic representation of a machine in the form of a computer system within which a set of instructions, when executed, may cause the machine to perform any one or more of the methodologies disclosed herein.

FIG. 7 depicts an exemplary diagrammatic representation of a machine in the form of a computer system 700 within which a set of instructions, when executed, may cause the machine to perform any one or more of the methods discussed above. One or more instances of the machine can operate as any of the devices discussed above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a computing device of the present disclosure includes broadly any electronic device that provides voice, video or data computing. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range computing (e.g., Bluetooth, WiFi, Zigbee), and long-range computing (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
obtaining, by a device comprising a processor, a game profile associated with a video game, wherein the game profile comprises desirable performance metrics for initiating the video game;
performing, by the device, performance metric measurements for factors identified in the game profile as contributing to a desirable gaming experience with respect to the video game and with respect to a computing device from which the video game is to be played;
comparing, by the device, the performance metric measurements to the desirable performance metrics of the game profile;
determining, by the device, a discrepancy between the performance metric measurements and the desirable performance metrics of the game profile;
determining, by the device, a gaming environment quality level for the game, according to the determined discrepancy; and
presenting, by the device, at the computing device a first quality indicator based on the determined gaming environment quality level.

2. The method of claim 1, wherein the performance metric measurements comprise a processor resource availability.

3. The method of claim 1, wherein the performance metric measurements comprise a speed of a network with which the computing device communicates.

4. The method of claim 1, wherein the performance metric measurements comprise a round trip communication network test.

5. The method of claim 1, wherein the presenting further comprises graphically displaying, by the device, the first quality indicator and the discrepancy.

6. The method of claim 1, further comprising performing a functional test at the computing device.

7. The method of claim 6, wherein the gaming environment quality level is further determined from a result of the functional test.

8. The method of claim 1, further comprising
obtaining, by the device, performance metric measurements relating to another computing device being used to play the video game at a remote location;
determining, by the device, a second gaming environment quality level for initiating the video game at the remote location according to the obtained performance metric measurements; and
presenting at the computing device a second quality indicator for the remote location based on the second gaming environment quality level.

9. The method of claim 8, further comprising presenting, by the device, a recommendation to use the remote location for initiating the video game based on one of the second gaming environment quality level, a distance between a present location of the computing device and the remote location, or both.

10. The method of claim 9, further comprising presenting, by the device, an indication that a user is present at the recommended remote location.

11. A gaming device, comprising:
a memory to store instructions, and
a processor coupled to the memory, wherein responsive to executing the instructions, the processor performs operations comprising:
obtaining a game profile associated with a game to be played with the gaming device, wherein the game profile comprises desirable performance metrics for playing the game;
performing performance metric measurements for factors identified in the game profile as contributing to a desirable gaming experience with respect to the game and with respect to the gaming device, comprising factors relating to a computing environment of the gaming device and a network coupled to the gaming device;
comparing the performance metric measurements to the desirable performance metrics of the game profile;
determining a difference between the performance metric measurements and the desirable performance metrics of the game profile; and
determining a gaming environment quality level according to the determined difference.

12. The gaming device of claim 11, wherein the operations further comprise presenting an indicator of the gaming environment quality level via a graphical user interface.

13. The gaming device of claim 11, wherein the operations further comprise performing a functional test in a computing or networking environment where the gaming device is located.

14. The gaming device of claim 13, wherein the functional test includes a measure of a battery power level for the gaming device.

15. The gaming device of claim 11, wherein the operations further comprise:
determining a second gaming environment quality level for playing the game at a location remote from a present location of the gaming device; and
presenting information descriptive of the second gaming environment quality level.

16. A non-transitory computer-readable storage medium, comprising instructions which, when executed by a processor, cause the processor to perform operations comprising:
performing a computing environment quality metric measurement for playing a game;
determining a gaming environment quality level for playing the game based on a comparison of the computing environment quality metric measurement and predetermined desirable environment quality metrics for environment quality factors associated with the game; and
presenting an indication of the determined gaming environment quality level,
wherein the environment quality factors are identified in a game profile associated with the game as contributing to a desirable gaming experience with respect to the game and with respect to a computing device used to play the game, the game profile comprising the desirable environment quality metrics.

17. The non-transitory computer-readable storage medium of claim 16, wherein performing the computing environment quality metric measurement further comprises performing a network environment quality metric measurement for a network.

18. The non-transitory computer-readable storage medium of claim 17, wherein the network environment quality metric measurement includes one of a first measure of a speed of communication using the network, a second measure of noise in the network, or both.

19. The non-transitory computer-readable storage medium of claim 16, wherein the indication is descriptive of a measure of achieving the predetermined desirable environment quality metrics.

20. The non-transitory computer-readable storage medium of claim 16, wherein the operations further comprise:
   determining a second gaming environment quality level for a remote location; and
   presenting a second indication descriptive of the second gaming environment quality level of the remote location.

21. The method of claim 8, further comprising
   obtaining, by the device, results of past performance metric measurements, performed in a specified time period, relating to the other computing device being used to play the video game at the remote location;
   determining, by the device, a third gaming environment quality level for initiating the video game at the remote location according to the past performance metric measurements; and
   presenting at the computing device a third quality indicator for the remote location based on the third gaming environment quality level.

22. The method of claim 21, wherein the second quality indicator and the third quality indicator are presented at the computing device, the second quality indicator being presented as a live gaming environment quality level and the third quality indicator being presented as a historic gaming environment quality level.

23. The method of claim 21, further comprising presenting at the computing device an indication of a source of data for the second quality indicator or the third quality indicator.

24. The method of claim 23, wherein the indication of the source of data comprises an indication whether the second quality indicator or the third quality indicator is based on live performance metric measurements or historic performance metric measurements.

25. The method of claim 8, further comprising presenting at the computing device location and direction information regarding the remote location.

26. The method of claim 10, further comprising presenting at the computing device information regarding a social network including a user of the computing device and the user at the remote location.

\* \* \* \* \*